(12) United States Patent
Ryu et al.

(10) Patent No.: US 8,704,649 B2
(45) Date of Patent: Apr. 22, 2014

(54) VIBROTACTILE DEVICE AND METHOD USING THE SAME

(75) Inventors: Dong Seok Ryu, Seoul (KR); Sung Chul Kang, Seoul (KR); Gi Hun Yang, Gongju-si (KR)

(73) Assignee: Korea Institute of Science and Technology, Seoul (KR)

( * ) Notice: Subject to any disclaimer, the term of this patent is extended or adjusted under 35 U.S.C. 154(b) by 355 days.

(21) Appl. No.: 12/671,004

(22) PCT Filed: Jan. 21, 2009

(86) PCT No.: PCT/KR2009/000316
§ 371 (c)(1),
(2), (4) Date: Jan. 21, 2009

(87) PCT Pub. No.: WO2010/085007
PCT Pub. Date: Jul. 29, 2010

(65) Prior Publication Data
US 2011/0018696 A1  Jan. 27, 2011

(51) Int. Cl.
| | |
|---|---|
| *G09B 21/00* | (2006.01) |
| *H04B 3/36* | (2006.01) |
| *G08B 5/36* | (2006.01) |
| *G08B 17/00* | (2006.01) |
| *G09G 5/00* | (2006.01) |
| *G06F 3/041* | (2006.01) |
| *H02K 7/06* | (2006.01) |
| *H02K 33/00* | (2006.01) |
| *G10L 15/00* | (2013.01) |

(52) U.S. Cl.
USPC ............... 340/407.2; 340/407.1; 340/815.49; 340/4.12; 340/582; 345/156; 345/173; 310/81; 310/36; 704/236

(58) Field of Classification Search
CPC ............. G06F 1/00; G06F 3/00; G06F 3/005; G06F 3/016; G06F 3/007; G06F 3/03549; G06F 2203/014; G06F 2203/013; G06F 3/017; G06F 9/04; G06F 1/169; G08B 6/00; G08B 1/00; G08B 2001/00; G09B 21/00; G01C 19/00; G01C 21/3364
USPC ........... 340/966, 971, 973, 974, 407.1, 407.2, 340/5.8, 10.1, 573.1, 573.7, 975, 945, 980, 340/961, 568.1, 522, 5.31, 5.61, 5.92, 505; 700/213–217, 226, 228, 229, 225, 22, 700/28; 342/63, 64, 65, 357.01, 357.06, 342/357.08, 357.09, 419, 29, 30, 32, 36, 342/455, 456, 454; 455/347, 348, 575.2, 455/403, 404.1, 91, 92, 567
See application file for complete search history.

(56) References Cited

U.S. PATENT DOCUMENTS

| | | | |
|---|---|---|---|
| 6,169,540 B1 | 1/2001 | Rosenberg et al. | |
| 6,219,032 B1 | 4/2001 | Rosenberg et al. | |
| 6,342,880 B2 | 1/2002 | Rosenberg et al. | |
| 6,718,304 B1 * | 4/2004 | Tachimori et al. | 704/236 |
| 7,019,622 B2 * | 3/2006 | Orr et al. | 340/407.1 |
| 7,292,227 B2 * | 11/2007 | Fukumoto et al. | 345/173 |
| 7,474,296 B2 | 1/2009 | Obermeyer et al. | |
| 2002/0054021 A1 | 5/2002 | Rosenberg et al. | |
| 2003/0229871 A1 | 12/2003 | Nakae et al. | |
| 2005/0017947 A1 * | 1/2005 | Shahoian et al. | 345/156 |
| 2006/0022536 A1 * | 2/2006 | Fujii et al. | 310/81 |
| 2006/0055515 A1 * | 3/2006 | Yatsu et al. | 340/407.2 |
| 2006/0157632 A1 * | 7/2006 | Delson | 248/550 |
| 2007/0046627 A1 * | 3/2007 | Soh et al. | 345/156 |
| 2007/0091063 A1 * | 4/2007 | Nakamura et al. | 345/156 |
| 2007/0216235 A1 * | 9/2007 | Lee | 310/36 |
| 2008/0084384 A1 | 4/2008 | Gregorio et al. | |
| 2008/0163051 A1 | 7/2008 | Olien | |
| 2009/0085882 A1 | 4/2009 | Grant et al. | |
| 2009/0132984 A1 | 5/2009 | Chander et al. | |
| 2011/0252390 A1 | 10/2011 | Sripada et al. | |

FOREIGN PATENT DOCUMENTS

| | | |
|---|---|---|
| KR | 10-2008-0039551 | 5/2008 |
| WO | WO 2008/045694 | 4/2008 |
| WO | WO 2009/045820 | 4/2009 |

OTHER PUBLICATIONS

PCT International Search Report and Written Opinion, PCT Application No. PCT/KR2009/000316, Oct. 14, 2009, 12 pages (including English translation).
Kim, Seung-Chan, et al. "An Evaluation of Human Sensibility on Perceived Texture for Real Haptic Representation," Journal of the Korean Institute of Information Scientists and Engineers: Software and Application, Oct. 2007, vol. 34, No. 10, 36 pages (including English translation).
Cheon, Jae-min, et al., "Evaluating a Learning Effect of Mapping Vibration Feedbacks to DIS Menu Items," 2008 Chugye Conference of the Korean Institute of Industrial Engineers, Nov. 8, 2008, 25 pages (including English translation).
Das, S. et al., "The Automatic Generation of Merged-Mode-Design Constraints," Jul. 29, 2009, fifteen pages. [Online] [Retrieval Date Unknown] Retrieved from the Internet <URL:http://fishtail-da.com/news.htm.>.
PCT International Search Report and Written Opinion, PCT Application No. PCT/KR2009/002631, Feb. 2, 2010, 14 pages.
Hollis, R.L. et al., "Lorentz Levitation Technology: A New Approach to Fine Motion Robotics, Teleoperation, Haptic Interfaces, and Vibration Isolation," *Proceedings of the International Symposium for Robotics Research*, Oct. 1993, twenty pages.

\* cited by examiner

*Primary Examiner* — Jennifer Mehmood
*Assistant Examiner* — Mirza Alam

(74) *Attorney, Agent, or Firm* — Fenwick & West LLP

(57) ABSTRACT

Disclosed herein is a vibrotactile device intuitively providing information by inducing a tactile sense to a user, and a method using the same. The device according to an embodiment includes a vibrating contact panel contacting with a user's hand; a plurality of vibratory modules that are attached to the lower part of the vibrating contact panel and vibrate with different intensities according to the amount of supplied power; and a plurality of vibration isolating links that are coupled, respectively, to an end of each of the modules to support the modules and to isolate the vibration from the modules.

5 Claims, 8 Drawing Sheets

VIBROTACTILE DEVICE AND METHOD USING THE SAME

TECHNICAL FIELD

This disclosure relates to a vibrotactile device intuitively providing information by inducing a tactile sense to a user, and relates to a method using the device. More specifically, it relates to a vibrotactile device demonstrating spatial directional and positional senses with a vibrating module provided with a handle-type apparatus that may be gripped by the user, and relates to a method for providing the user with vibratory stimuli to make him or her recognize spatial directional and positional information.

BACKGROUND ART

A method that provides tactile sensation using vibration has been applied as a method for intuitively providing information in a variety of input devices.

In some videogames, for example, the joystick has an eccentric motor inside that may generate vibration, and provides a user with vibratory stimuli in several situations when a car collides in racing games or an avatar is attacked in combative sports games. From these stimuli, the user may intuitively sense a risky situation in the games.

In cell phones, a vibratory sensation may be used to replace a ring mode with a vibration mode, and demonstrate states of operation such as a keypad manipulation and an alert of battery shortage in an intuitive way. Many trials have recently been performed to subdivide vibratory sensations by structurizing patterns of vibration in different ways using a number of vibratory motors.

For haptic glove for interaction with virtual environments, a user may manipulate an avatar in a virtual environment by the motion of his or her hand through the haptic glove. Further, vibratory devices installed in the part of fingers and the palm of the glove operate properly in accordance to several situations to make the user to be completely immersed in those situations.

These methods for producing vibration have used a method with existing devices that do not distinguish the portions stimulated by vibrations when delivering vibratory sensation to the user's hand. Thus the existing methods are limited in patterns of vibrations for providing information, and have difficulties in representing more sophisticated information such as a spatial position or direction.

DISCLOSURE OF INVENTION

In one aspect, there is provided a vibrotactile device including a vibrating contact panel that contacts a user's hand; a plurality of vibratory modules that are attached to the lower part of the vibrating contact panel and vibrate with different intensities according to the amount of supplied power; and a plurality of vibration isolating links that are coupled, respectively, to an end of each of the modules to support the modules and to isolate the vibration from the modules.

The vibrating contact panel may be made up of a combination of a plurality of pieces.

The vibrotactile device may further include an inner frame coupled to the plurality of vibration isolating links to maintain the arrangement of each of the modules, wherein the inner frame isolates vibration transmitted inwards through the vibration isolating links.

The vibrotactile device may further have a vibratory controller, wherein the controller evaluates an aimed point of the coordinates on the surface of the vibrating contact panel, at which vibration is to be generated, calculates the distance between the aimed point of the coordinates and each of the modules, and controls the amount of power distributed to each of the modules based on the calculated distance.

The vibratory controller may include a controller calculating the amounts of power distributed to each of the modules to output pulse-width modulation (PWM) commands or voltage commands; and an amplifier converting the PWM commands or voltage commands to operating voltages to operate motors.

The device may further include supporting members connected between the vibration isolating links to maintain the arrangement of the links.

The module may have an eccentric motor or a linear piezoelectric actuator.

The link may be made up of a spring or a sponge.

In another aspect, there is provided a method for generating vibrations using a vibrotactile device having vibratory modules. The method includes (a) outputting a command regarding directional and positional information which is to be delivered to a user according to processing conditions of a program; (b) converting the directional and positional information, which is to be delivered to the user, into an aimed point of the coordinates on the surface of the vibrotactile device; and (c) operating the vibratory module corresponding to the aimed point of the coordinates, or, if there is not the modules corresponding to the aimed point of the coordinates, operating a plurality of the modules adjacent to the coordinates.

Operating step (c) includes (c1) selecting a plurality of modules adjacent to the aimed point of the coordinates; (c2) calculating the distances from the aimed point of the coordinates to each of the modules; (c3) distributing the amount of power supplied to each of modules based on the calculated distances; and (c4) operating each of modules with vibratory intensity corresponding to the distributed power.

MODE FOR THE INVENTION

Exemplary embodiments now will be described more fully hereinafter with reference to the accompanying drawings, in which exemplary embodiments are shown.

Figure 1:
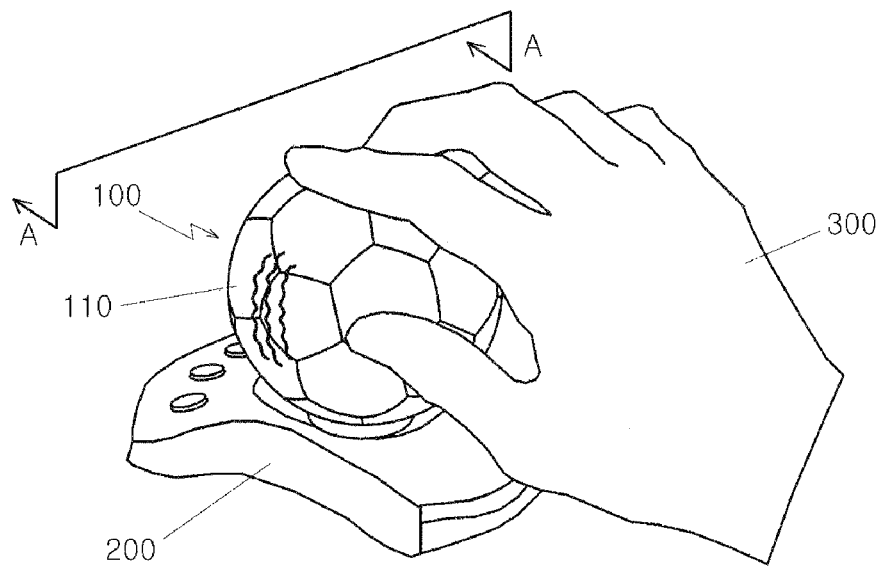
FIG. 1 is a view schematically representing structures of the vibrotactile device according to one embodiment of the present invention.
Figure 2:
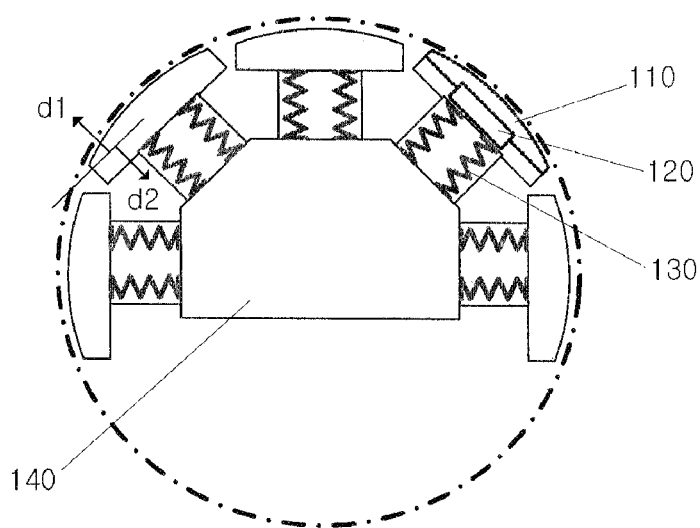
FIG. 2 is a sectional view partially illustrating the device, taken along the A-A line of FIG. 1.

FIG. 1 schematically illustrates the structure of a vibrotactile device according to one embodiment of the present invention, and FIG. 2 is a sectional view partially representing the vibrotactile device, which is taken along the A-A line of FIG. 1.

As illustrated in FIGS. 1 and 2, the vibrotactile device 100 includes a vibrating contact panel 110, vibratory modules 120 and vibration isolating links 130. Optionally, the device 100 may further include an inner frame 140 and/or a vibration controller (not shown in the figures).

The vibrating contact panel 110 has a surface which a user's hand 300 may contact, and the panel 110 may be constructed in a spherical shape as illustrated in FIG. 1. The panel 110 may be integrally made as one piece, or may be formed from the combination of a plurality of pieces. The pieces of the panel 110 are not limited in shape, and may be pentagonal or hexagonal.

The surface of the vibrating contact panel 110, which is comprised of a plurality of the pieces that are connected to each other, is shaped so that the user may easily grip the device. The shape of the surface is not limited so long as the above purpose is achieved, and may be any type, such as a bar, an oval or a hexahedron.

In case the surface of the panel 110 is designed as a sphere, the panel may be about 80 mm in diameter so that the user may grip and manipulate easily.

A plurality of the vibratory modules 120 are attached to the lower part of the vibrating contact panel 110, and vibrate with different intensities based on a supply of power. The modules 120 vibrate with the supply of power to transfer that vibration to the vibrating contact panel 110, and make the user feel the stimuli through his or her tactile sense. The module 120, for example, may include an eccentric motor or a linear piezo-electric actuator. When a particular vibratory module vibrates, the user may recognize information on a spatial direction or position by sensing the vibratory stimulus from the module corresponding to that direction or position.

The vibration isolating links 130 are coupled, respectively, to one end of the vibratory modules 120, supporting the modules 120, and isolate the vibrations transferred from the modules 120. When the modules 120 operate respectively, the vibrations of the modules 120 in operation must not be transferred to the other modules 120, which vibrate at the other positions, in order for the user to recognize accurately the position of the operating modules 120 from the other modules 120.

The vibration isolating links 130 transfer the vibrations generated from the vibratory modules 120 to the user in the outward direction d1, and isolate other vibrations transmitted in the inward direction d2 to minimize the transference of the vibration in the direction d2. The links 130 may be made of springs or sponge.

The inner frame 140 is coupled, opposite to the vibratory module 120, to a plurality of the vibration isolating links 130, and isolates a vibration transmitted through the links 130. Although the links 130 damp much of the vibration that is generated from a particular module 120 and transmitted in the inward direction d2, there is still a possibility that the aftershock of the vibration from the particular module 120 may spread to adjacent modules 120 and pieces of the vibrating contact panel 110.

The inner frame 140 isolates again a small vibration transmitted through the links 130 in order to prevent the vibration from being delivered to adjacent links 130. This minimizes the interference between operating modules 120 and other standstill modules 120, thereby preventing the positions of vibratory stimuli from being confused or obscured.

The vibration controller (not shown in the figures) evaluates the coordinates of a point on the surface of the vibrating contact panel 110 at which a vibration is intended to be generated, calculates the value of a distance between the coordinates of that point and each of the modules 120, and controls a supply of power distributed to each of the modules 120 based on the calculated value of the distance. The process will be explained in detail below.

Referring to FIG. 1 again, the vibrotactile device 100 may be coupled to an input device 200, or may be formed integrally with the input device 200. The input device 200 is to input a command signal when the program operates, and may be designed as a joystick, a mouse, or a keyboard, etc.

FIGS. 3 to 6 schematically illustrate a method for representing spatial directions using the vibrotactile device.

Figure 3:
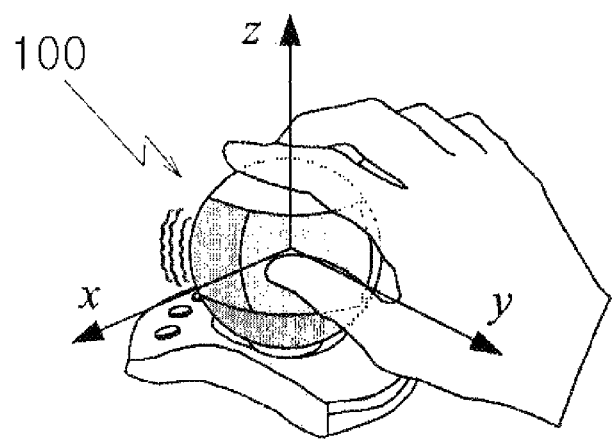
FIGS. 3 to 6 are views schematically illustrating a method for representing a spatial positional information using the device.

As shown in FIG. 3, six vibratory modules 120 are arranged on a spherical vibrotactile device 100 to be spaced apart at an angle of 90 degrees. When x-, y-, and z-axes of the coordinates on the device 100, which is gripped by the user's hand 300, are defined, respectively, as the directions of the thumb, the ankle, and the back of the hand, the user may sense, with his or her palm, the stimulus in the direction corresponding to the module 120 in operation among the whole modules 120 mounted on the device 100.

Figure 4:
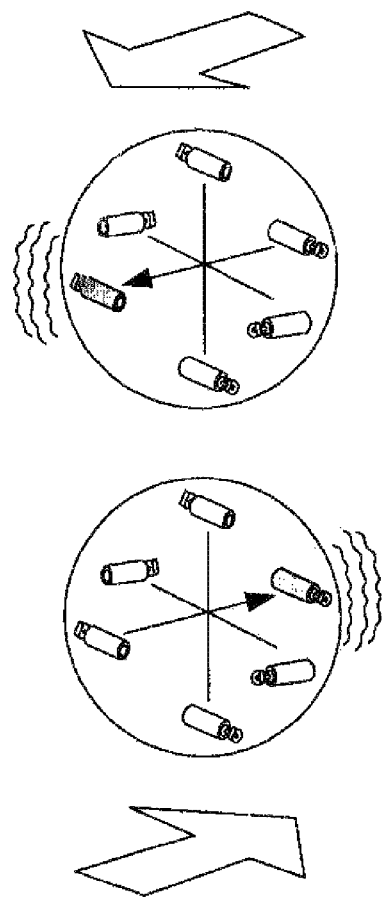
Figure 5:
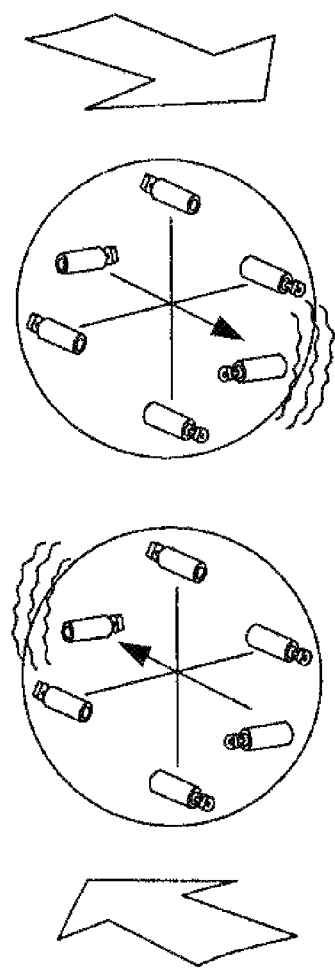
Figure 6:
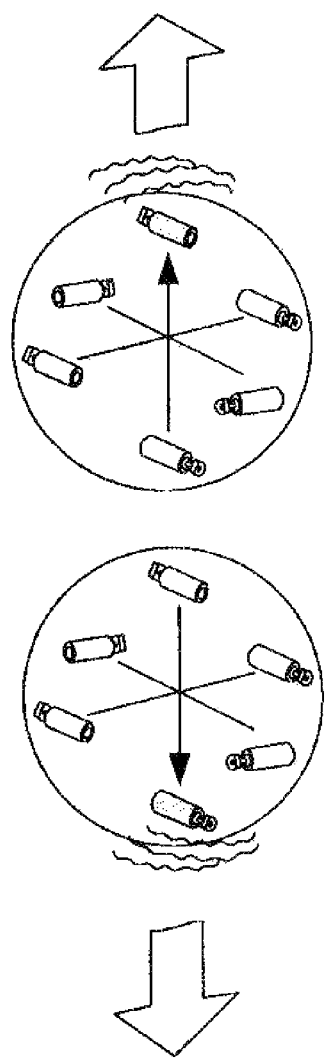

FIGS. 4 to 6 show that a vibration is transmitted in each of x-, y- and z-directions when the vibratory module 120 operates. The user may recognize spatial directional information corresponding to the direction of each axis, or spatial positional information corresponding to the position on the spherical surface of the device.

Although the embodiment explained above demonstrates the method for representing information on six directions corresponding to the vibratory modules 120, more directional information may be transmitted using a larger number of vibratory modules 120.

Meanwhile, more directions or positions may be represented than the number of the modules 120 by adjusting and combining properly the intensities of vibrations from the modules 120. Explained below is a method for representing spatial positional information corresponding to an area in between the modules 120 by properly combining or adjusting supplies of power to neighboring modules 120.

Figure 7:
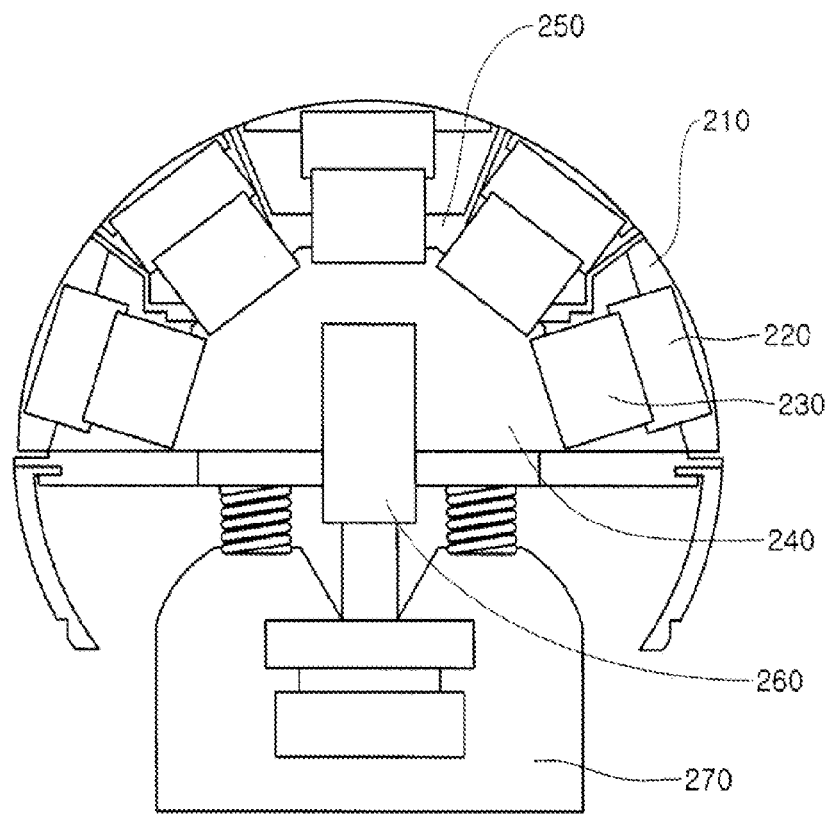
FIG. 7 is a sectional view of the vibrotactile device according to another embodiment of the present invention.

FIG. 7 is a sectional view of the vibrotactile device according to another embodiment of the present invention.

The vibrotactile device, as shown in FIG. 7, is provided integrally with an input device 270, and includes a vibrating contact panel 210, vibratory modules 220, vibration isolating links 230, an inner frame 240, supporting members 250, an input handle 260, and a vibratory controller (not shown in the figures).

Generally, the more vibratory modules 220 are arranged, the more positions the vibrotactile device may represent, but the vibratory modules 220, which may be used for the device, are limited in number due to constraints in space and cost. If the vibrotactile device, in the embodiment, is designed about 80 mm in diameter, the modules 220 may be spaced about 25 mm apart to represent efficiently the portions of their vibrations.

When the modules 220 vibrate, the vibrations are transferred through the vibrating contact panel 210 to the users hand, and the rest of the vibrations, which travel inwards, are damped by the vibration isolating links 230. However, prolonged production of vibration may weaken the capability of the links 230 of isolating the vibration, and alter the arrangement of the links 230 in the process of isolating the vibration.

The change in the arrangement of the links 230 may distort the surface of the vibrating contact panel 210, and induce an incorrect signal input.

The supporting members 250 are connected to the vibration isolating links 230 between the neighboring links 230, and maintain the arrangement of the links 230. Accordingly, the changes of the arrangement of the links 230, distortion of the surface of the panel 210, and the incorrect signal input, etc. may be prevented.

The input handle 260 converts physical changes in positions caused by the manipulations of the vibrotactile device into electronic signals, and transfers them to the input device 270. The device 270 uses the electronic signals as an input signal for executing the program.

The vibratory controller (not shown in the figures), specifically, may include a controller and an amplifier.

The controller calculates the amount of power distributed to each of the modules 220, and outputs pulse-width modulation (PWM) commands or voltage commands.

The amplifier converts the PWM or voltage commands to operating voltages, and operates motors. The operation of the motors, then, vibrates the vibratory modules 220.

In the process above, for example, the PWM power may be divided into ten different levels of power to provide ten different stimuli of vibration. The controller may update the PWM commands at sampling intervals of 1 msec.

Figure 8:
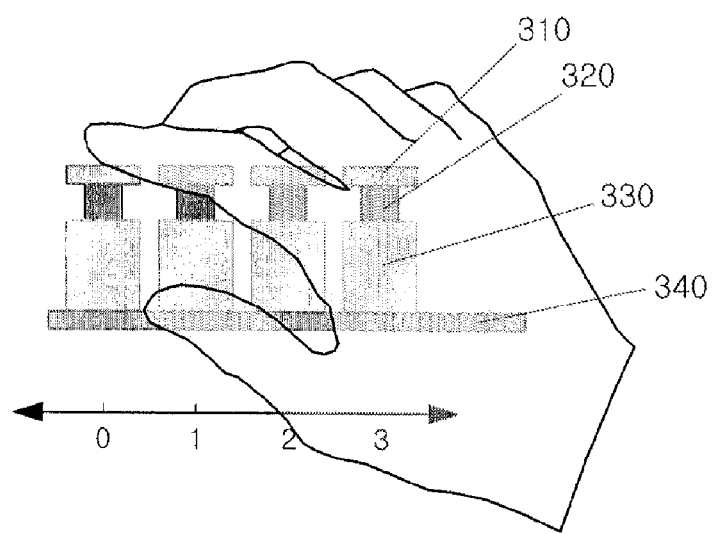
FIG. 8 is a view explaining how to represent 1-DOF (degree of freedom) positional information using the vibrotactile device.

FIG. 8 is a view explaining how to represent positional information 1-DOF (degree of freedom) system.

Referring to FIG. 8, vibration isolating links 330 are mounted on a linear frame 340, and vibratory modules 320 are attached on the upper end of the links to generate vibrations at a vibrating contact panel 310 which may contact the body of a user.

The user may sense a vibratory stimulus by touching the panel 310 with his or her fingers. Namely, when each of the modules 320 generates vibration, the user may recognize positional information by sensing the position of the vibration in the process of the program.

In FIG. 8, the positions of the vibrations generated from the modules 320 may be defined as the 1-DOF points on which the modules 320 are mounted respectively, i.e. the discontinuous points corresponding to 0, 1, 2, and 3. For example, when the user feels on his or her second finger the vibration generated by the leftmost first vibratory module 320, he or she may intuitively recognize the information on the position 0. Similarly, the user may acknowledge the information regarding the position 2 when the third module 320 gives his or her ring finger a vibratory stimulus.

The method for representing four quantized points along a straight line of the 1-DOF system using four vibratory modules 320 was explained above. Below, the method is extended to represent more points than the number of the modules 320 along the straight line of the 1-DOF system.

Figure 9:
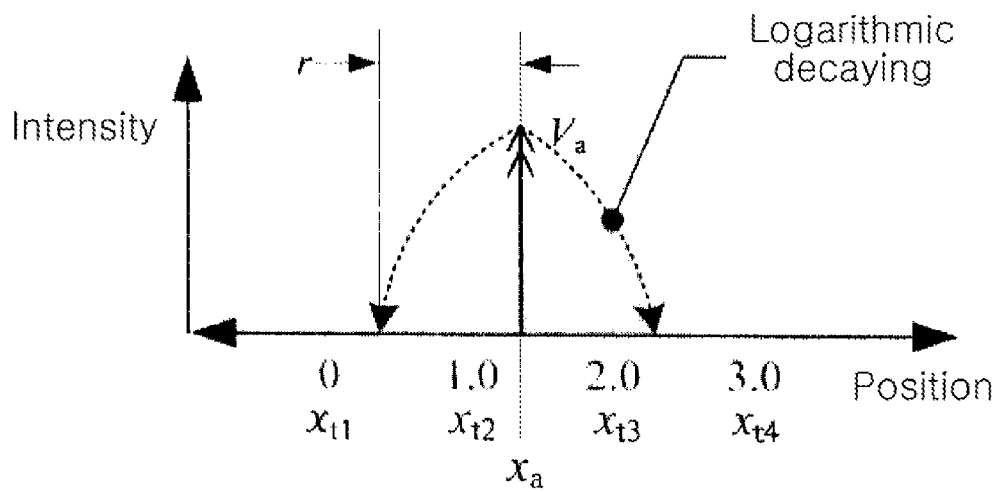
FIGS. 9 and 10 are graphs showing a variation in vibratory intensities with respect to the distance from the vibration generated at a particular position.
Figure 10:
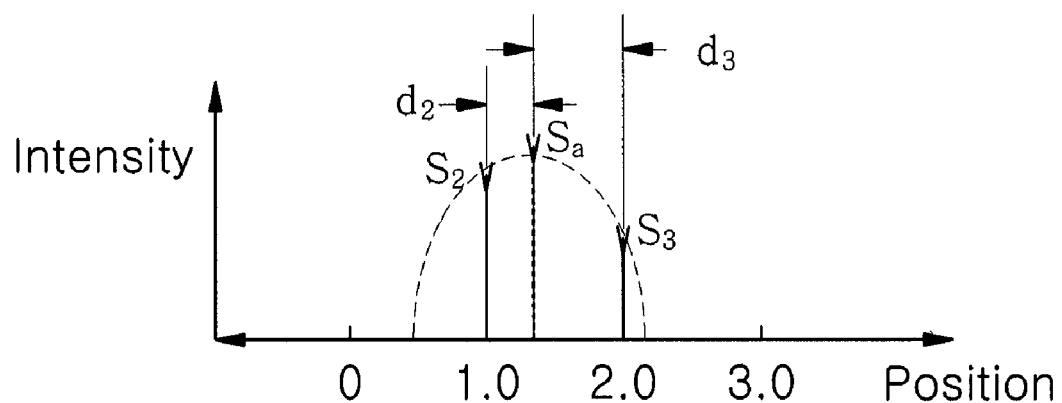

FIGS. 9 and 10 are graphs illustrating the changes in intensity of vibration with respect to the distance to the vibration generated at a certain point.

As illustrated in FIGS. 9 and 10, the intensity $V_a$ of the vibration generated at a particular position $x_a$ decreases logarithmically (or linearly) with respect to the distance. This is generally associated with the fact that the human cognitive faculty decreases logarithmically with respect to the position of a vibratory stimulus. Accordingly, when the vibratory module 320 is arranged at a particular point between 1 and 2, the intensity of the stimulus recognized by the user may be modeled to decrease logarithmically. This relationship may be denoted as follows:

if $|x_a - x_{ti}| < r$, [Math Figure 1]

$$I_{p,i} = k\ln\left\{\frac{(e-1)}{r}(|x_1 - x_{ti}| - (x_a + e))\right\} \cdot Va$$

else $I_{p,i} = 0$ where r is the maximum range that the user may recognize the vibration from the particular distance $x_a$, $V_a$ is the intensity of the vibration generated at the point $x_a$, and $I_{p,i}$ is the intensity of the vibration that the user may recognize at each point.

For example, if the finger of the user comes into contact at points $x_{t2}$ and $x_{t3}$, the intensity of the vibration generated at a particular point $x_a$ between $x_{t2}$ and $x_{t3}$ decreases with respect to the distance $d_2$ and $d_3$, and the user senses the intensity $S_2$ and $S_3$, respectively. The decreased intensity of vibration may be generally represented as follows:

$$S_i = k\ln\left\{\frac{(e-1)}{r}(d_i - (x_a + e))\right\}, \text{ when } d_i < r \quad \text{[Math Figure 2]}$$

Figure 11:
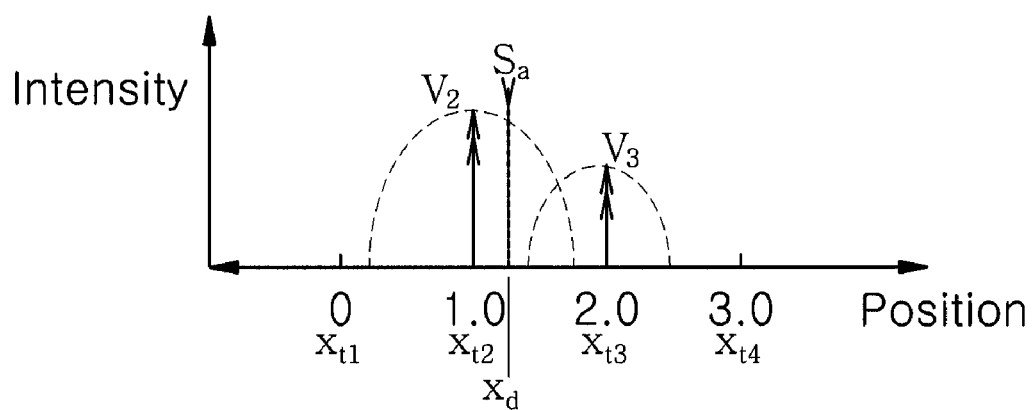
FIGS. 11 and 12 are graphs illustrating how to represent a particular position between vibratory modules using the combination of the vibratory intensities of the modules arranged in a quantized location.
Figure 12:
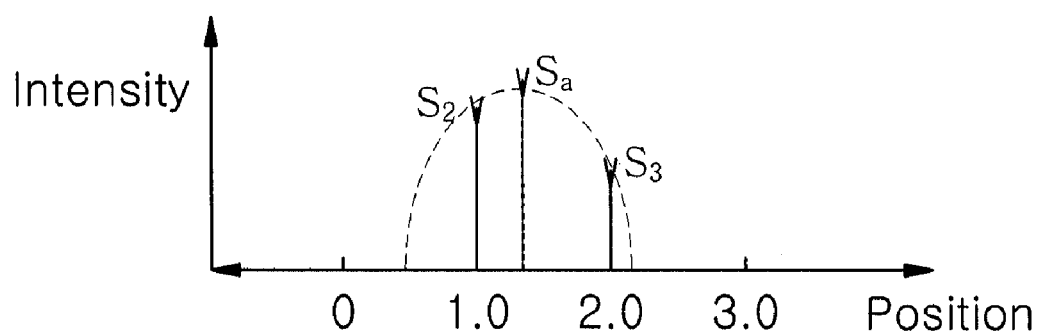

FIGS. 11 and 12 are graphs illustrating a method for representing a particular point between vibratory modules using the combination of the intensity of vibrations, which come from the modules mounted on quantized positions.

In FIGS. 11 and 12, the intensity of vibration, which is sensed with respect to the distance, is considered to represent the vibration at a particular point. When the vibratory modules 320 are arranged at four quantized, fixed points, the intensity of vibration generated from each of the modules 320 may be adjusted to represent the particular point between the modules 320.

As shown in FIG. 11, in case, for example, that a particular point $x_d$, which is to be represented, is located between $x_{t2}$ and $x_{t3}$ which the vibratory modules are arranged, if vibrations from the modules are generated with intensities $V_2$ and $V_3$ at each of their locations, the user senses the vibratory stimulus similar to the intensity $S_a$ as if the vibration were generated at $x_d$. According to this method, powers supplied to the vibratory modules 320 are properly adjusted to represent information on an arbitrary point at which no vibratory module 320 is located.

Explained above is the method, with the vibratory device 100, for representing the positional information of a particular point by combining the intensities of vibrations from the vibratory modules 320 in the 1-DOF system. However, the vibrotactile device 100 described herein may be used for higher DOF in the same way.

Figure 13:
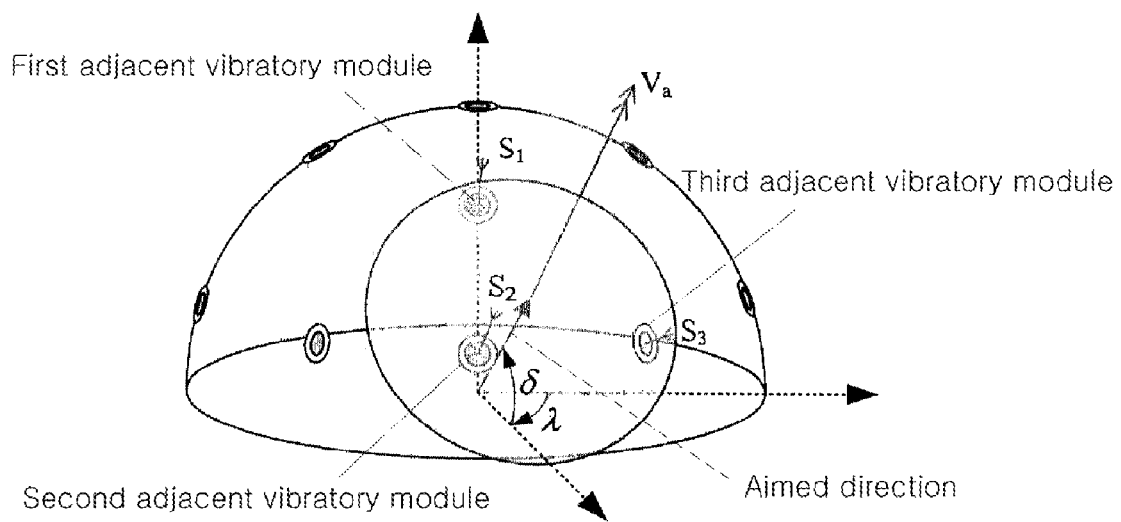
FIG. 13 is a view explaining how to represent 2-DOF positional information using the vibrotactile device.

FIG. 13 is a view illustrating a method for representing 2-DOF positional information.

As shown in FIG. 13, the vibratory modules 120 are arranged at quantized points on a spherical surface. For illustrative purpose, the modules 120 are arranged one at the north pole, four along the periphery on a lower latitude, and eight along the peripheral on a much lower latitude. 2-DOF positional or directional information may be described by the longitude λ and the latitude δ in spherical coordinates.

In FIG. 13, the directions in which the modules 120 are arrange are represented with the DOF of their longitude λ and latitude δ, and may be converted to the positional information $x_i$ on the 2-DOF spherical surface, and also be represented in rectangular coordinates as follows:

$$x_{ti} = \rho \begin{bmatrix} \cos\lambda_i \cos\delta_i \\ \sin\lambda_i \cos\delta_i \\ \sin\delta_i \end{bmatrix} \quad \text{[Math Figure 3]}$$

In order to induce the stimulus similar to the intensity $V_a$ of vibration generated at a particular point $x_a$ between vibratory modules on the spherical surface, the intensities $S_1$, $S_2$, and $S_3$ of vibrations from adjacent first, second and third vibratory modules are combined. In order to evaluate the distance between the point of each module 120 on the spherical surface and the particular point which is to be represented, the angle α between directional vectors is calculated according to the following equation.

$$\begin{aligned}\cos\alpha &= \hat{x}_{ti} \cdot \hat{x}_{tj} \quad \text{[Math Figure 4]}\\ &= \cos\delta_i \cos\delta_j (\sin\lambda_i \sin\lambda_j + \cos\lambda_i \cos\lambda_j) + \\ &\quad \sin\delta_i \sin\delta_j \\ &= \cos\delta_i \cos\delta_j \cos(\lambda_i - \lambda_j) + \sin\delta_i \sin\delta_j\end{aligned}$$

Given that the angle α is known, and when the coordinates of the first, second, and third vibratory modules on the spherical surface are represented as $(\lambda_1, \delta_1)$, $(\lambda_2, \delta_2)$, and $(\lambda_3, \delta_3)$, respectively, and the particular point $x_a$ on the spherical surface is converted in $(\lambda_a, \delta_a)$ using the longitude and latitude, the arc distance d between two points on the surface of the sphere is given by the following equations.

$$d_{1a} = \rho \cos^{-1}(\cos\delta_1 \cos\delta_a \cos(\lambda_1 - \lambda_a) + \sin\delta_1 \sin\delta_a)$$

$$d_{2a} = \rho \cos^{-1}(\cos\delta_2 \cos\delta_a \cos(\lambda_2 - \lambda_a) + \sin\delta_2 \sin\delta_a)$$

$$d_{3a} = \rho \cos^{-1}(\cos\delta_3 \cos\delta_a \cos(\lambda_3 - \lambda_a) + \sin\delta_3 \sin\delta_a) \quad \text{[Math FIG. 5]}$$

where $d_{1a}$ is the distance between the first vibratory module and the particular point $x_a$, $d_{2a}$ is the distance between the second vibratory module and the particular point $x_a$, and $d_{3a}$ is the distance between the third vibratory module and the particular point $x_a$.

When the distances regarding the points are obtained, the intensity $V_a$ of vibration, which is the combination of the intensities $S_1$, $S_2$, and $S_3$ decreased with respect to the achieved distances, is provided to the user in the similar way to the case of the 1-DOF system explained referring to FIGS. 11 and 12. Therefore, the user may sense the desired point $x_a$ of vibration through a vibratory sense.

Figure 14:
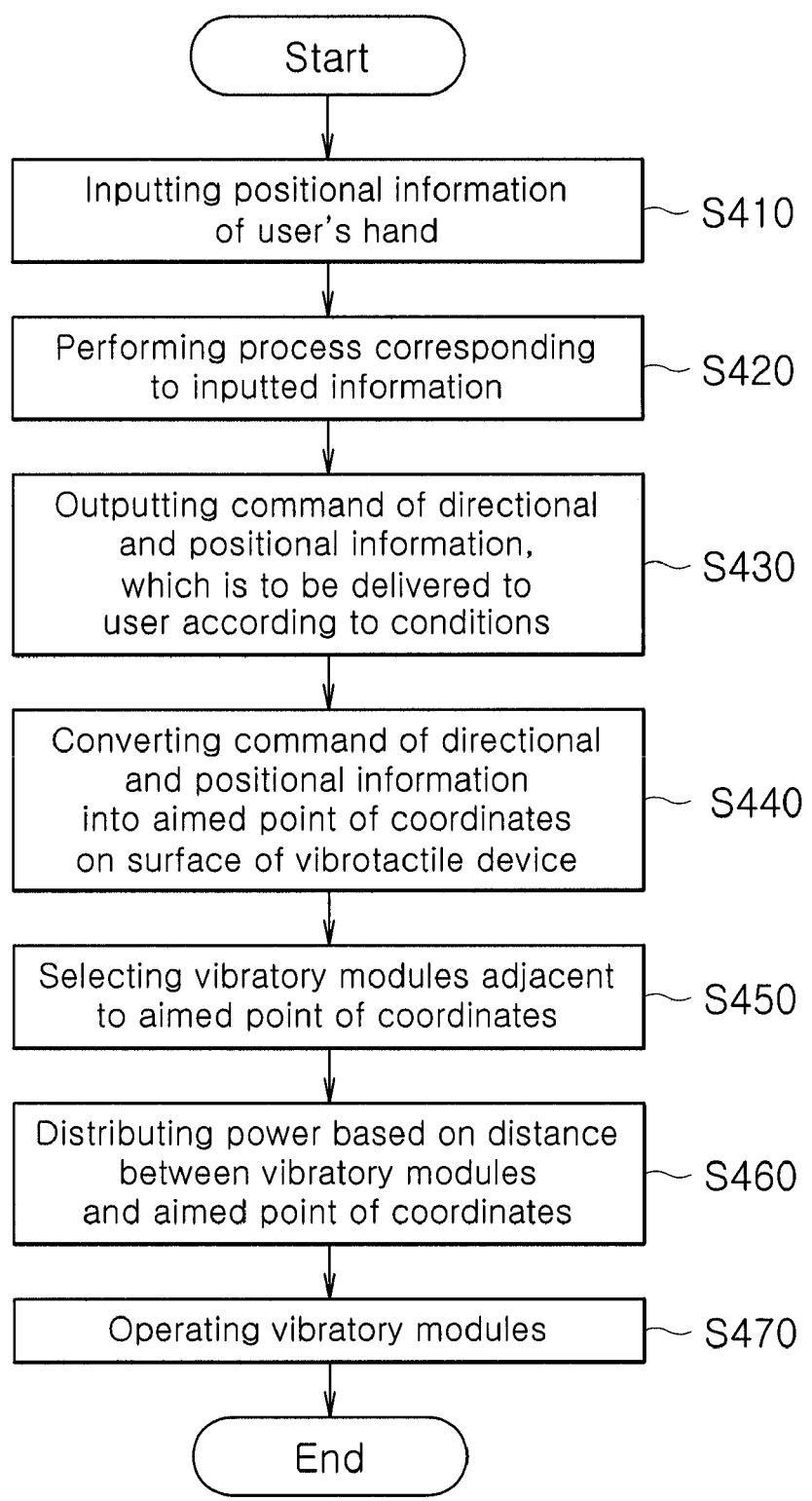
FIG. 14 is a flowchart of the method using the vibrotactile device according to one embodiment of the present invention.

FIG. 14 is a flow chart of the method using the vibrotactile device according to one embodiment of the present invention.

As shown in FIG. 14, the vibrotactile device 100 is coupled with an input device 200 or integrated with the input device 200. The positional information on the user's hand is inputted into the program, which operates associated with the input device 200 (S410). Then, a process corresponding to the information inputted based on the positional information about the hand is performed on the program (S420).

Thereafter, in the process of the program, a command of the directional and positional information, which is to be delivered to the user, is outputted based on the processing conditions of the program (S430).

Then, the vibratory controller receives the command of the information and converts it to an aimed point of the coordinates on the surface of the device 100 (S440). The controller outputs the command operating the associate vibratory module 120 if there is the module 120 corresponding to the aimed point of the coordinates. If there is no module 120 corresponding to the aimed point of the coordinates, the vibratory controller selects a plurality of adjacent modules 120 (S450), and calculates the distances from the aimed point of the coordinates on the surface to each of the modules 120.

Further then, the amount of power supplied to each of the modules 120 is distributed based on the calculated distance (S460), and each of the modules 120 is operated with vibratory intensity corresponding to the power (S470). Based on the vibrations of the vibratory modules 120, the user may determine the spatial directional and positional information from the portions of the vibratory stimuli sensed by his or her palm.

While the exemplary embodiments have been shown and described, it will be understood by those skilled in the art that various changes in form and details may be made thereto without departing from the spirit and scope of this disclosure as defined by the appended claims.

The invention claimed is:

1. A vibrotactile device comprising:
   a vibrating contact panel constructed in a three-dimensional shape, the vibrating contact panel including a plurality of pieces forming an outer surface of the vibrating contact panel configured to contact a hand of a user and an inner surface;
   a plurality of vibratory modules attached to the inner surface of the vibrating contact panel, wherein the plurality of vibratory modules vibrate with different intensities according to the amount of supplied power and wherein each of the plurality of vibratory modules is attached to one of the plurality of pieces of the vibrating contact panel;
   a plurality of vibration isolating links, each of the plurality of vibration isolation links coupled to an end of a corresponding one of the plurality of vibratory modules, wherein the plurality of vibration isolation links support the plurality of vibratory modules and isolate the vibration from the plurality of vibratory modules;
   supporting members connected between the plurality of vibration isolating links to maintain an arrangement of the plurality of vibration isolating links; and
   a vibratory controller configured to evaluate an aimed point of coordinates on the outer surface of the vibrating contact panel at which vibration is to be generated, calculate a distance between the aimed point of the coordinates and each of the plurality of vibratory modules, and control the amount of supplied power distributed to each of the plurality of vibratory modules based on the calculated distance;
   wherein each of the plurality of pieces of the vibratory contact panel are configured to vibrate at an intensity caused by a vibratory module coupled to the piece of the vibratory contact panel.

2. The device according to claim 1, further comprising an inner frame coupled to the plurality of vibration isolating links to maintain the arrangement of each of the plurality of vibratory modules, wherein the inner frame isolates vibration transmitted inwards through the plurality of vibration isolating links.

3. The device according to claim 1, wherein said vibratory controller comprises:
   a controller calculating the amount of supplied of power distributed to each of the plurality of vibratory modules to output pulse-width modulation (PWM) commands or voltage commands; and
   an amplifier converting said PWM commands or voltage commands to operating voltages to operate motors.

4. The device according to claim 1, wherein each of the plurality of vibratory modules comprises an eccentric motor or a linear piezoelectric actuator or a linear vibration actuator.

5. The device according to claim 1, wherein each of the plurality of vibration isolating links comprises a spring or a sponge.

\* \* \* \* \*